(12) United States Patent
Pascual et al.

(10) Patent No.: US 7,107,147 B2
(45) Date of Patent: Sep. 12, 2006

(54) DATA CORRECTION METHOD AND APPARATUS USING KEY FILTERING FUNCTION FOR ENTERING DATA IN NAVIGATION SYSTEM

(75) Inventors: Joey Pascual, Downey, CA (US); Ihung S. Tu, Anaheim, CA (US)

(73) Assignee: Alpine Electronics, Inc, Tokyo (JP)

( * ) Notice: Subject to any disclaimer, the term of this patent is extended or adjusted under 35 U.S.C. 154(b) by 155 days.

(21) Appl. No.: 10/940,331

(22) Filed: Sep. 14, 2004

(65) Prior Publication Data
US 2006/0058943 A1 Mar. 16, 2006

(51) Int. Cl.
G01C 21/00 (2006.01)

(52) U.S. Cl. ...................... 701/200; 715/780
(58) Field of Classification Search ................. 715/780
See application file for complete search history.

(56) References Cited

U.S. PATENT DOCUMENTS 5,864,340 A * 1/1999 Bertram et al. ............. 715/780
6,370,282 B1 * 4/2002 Pavley et al. ............... 382/311
7,003,397 B1 * 2/2006 Yokota et al. .............. 701/200
2002/0067377 A1 6/2002 McGovern

* cited by examiner

Primary Examiner—Michael J. Zanelli
(74) Attorney, Agent, or Firm—Muramatsu & Associates

(57) ABSTRACT

An input data correction method and apparatus for a navigation system that has a key filtering function to assist the user to determine possible entries for inputting data. The input data correction method includes the steps of displaying a keyboard screen, inputting data through alphanumeric keys on the keyboard screen, positioning a cursor to a location of a character of the input data that is desired to be changed, searching for candidate entries that match the input data if the character at the cursor location of the input data is changed, highlighting alphanumeric keys corresponding to the characters to change the character at the cursor location so that the input data after the change match with the candidate entries, and selecting one or more highlighted keys thereby changing the input data to the candidate entry.

16 Claims, 12 Drawing Sheets

Prior Art

Fig. 1A

| MENU |
|---|
| Destination |
| Set Up |
| Option |
| Route |

Fig. 1B

| Dest | Find Destination by |
|---|---|
| Address ||
| Intersection ||
| Point of Interest ||
| Map Cursor ||
| Recent Route ||
| Address Book ||

Fig. 1C

| Dest | Find Destination by |
|---|---|
| Place Type ||
| Place Name ||
| Within City ||

Fig. 1D

| Dest | Input Place Name |
|---|---|

MOBIL_

| A | B | C | D | E | F | G | H | I | J | Delete |
| K | L | M | N | O | P | Q | R | S | T | |
| U | V | W | X | Y | Z | & | ' | / | - | Space |
| 1 | 2 | 3 | 4 | 5 | 6 | 7 | 8 | 9 | 0 | |

MOBIL
MOBILE

Fig. 1E

| CONFIRM ROUTE |
|---|
| MOBILE<br>CA-1101 St.<br>Torrance, CA |
| By Quickest Route Method |
| OK to Proceed |
| Options |

Fig. 1F

| NEXT TURN: ↰ 0.8 MI |
| PRAIRIE AVE. |
| VP   NP |
| ⌊1/8mi⌋ |
| TO    16 MI    0:15 TO GO |
| ON: W. 190TH ST., TORRANCE |

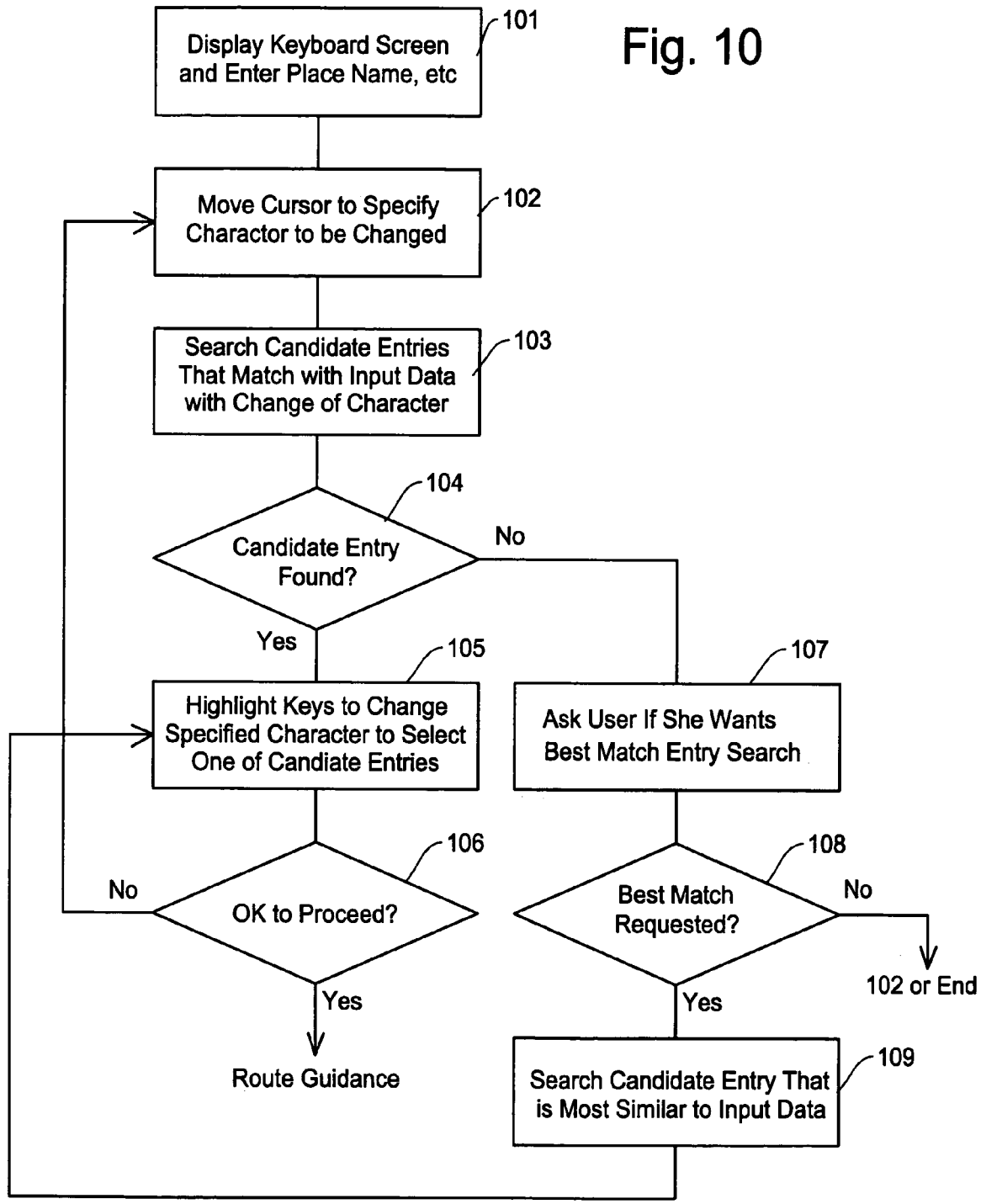

DATA CORRECTION METHOD AND APPARATUS USING KEY FILTERING FUNCTION FOR ENTERING DATA IN NAVIGATION SYSTEM

FIELD OF THE INVENTION

This invention relates to an input data correction method and apparatus for a navigation system, and more particularly, to an input data correction method and apparatus having a key filtering function to assist the user to determine possible entries for inputting data in a navigation system and to reflect the results on a display of the navigation system.

BACKGROUND OF THE INVENTION

A navigation system performs travel guidance for enabling a user to easily and quickly reach the selected destination. A typical example is a vehicle navigation system where a user's vehicle is equipped with a navigation function. Such a navigation system detects the position of the user or user's vehicle, and reads out map data pertaining to an area at the current vehicle position from a data storage medium, for example, a DVD (digital versatile disc), or a hard disc. Alternatively, such map data can be provided to the user from a remote server through a communication network such as Internet.

When a destination is set, the navigation system starts a route guidance function for setting a guided route from the start point to the destination. During the route guidance, the navigation system reads the nodes data from the data storage medium and successively stores the nodes data of road segments constituting the guided route in a map memory. In the actual traveling, the node series stored in the map memory is searched for a portion of the guided route to be displayed in a map display area of the monitor screen, and the portion of the guided route is highlighted to be clearly distinguished from other routes.

FIGS. 1A–1F show an example of procedure and screen display involved in the navigation system for specifying a destination and guiding the user to the destination. A main menu screen such as shown in FIG. 1A displays menu items including a "Destination" menu for entering the destination. When selecting "Destination", the navigation system displays a "Find Destination by" screen as shown in FIG. 1B for selecting an input method for specifying the destination. The "Find Destination By" screen lists various methods for selecting the destination including "Address" for specifying the city and address of the destination, "Intersection" for specifying the names of two streets which intersect with one another, and "Point of Interest" (POI) for selecting the programmed destination based on the name, category or telephone number. Other methods in the "Find Destination by" screen include "Recent Route" for specifying the destination based on the recent history of destinations saved in the navigation system, and "Address Book" for selecting the address of the destination from a prescribed address list stored in the system.

When selecting, for example, the "Point of Interest" method in FIG. 1B, the navigation system displays selection methods of point of interest (POI) either by "Place Name" or "Place Type" in FIG. 1C. The "Place Name" is to specify a name of POI, and the "Place Type" is to specify a category of POI. If the "Place Name" is selected in FIG. 1C, the navigation system shows an "Enter Place Name" screen such as shown in FIG. 1D. The screen of FIG. 1D is basically a keyboard for inputting the name in an input box on the monitor screen. The user inputs the name of the desired POI in the input box through the keyboard.

FIG. 1E shows a "Confirm Route" screen of the navigation system for confirming the destination. If the place name displayed is the correct destination, the user enters an "OK to Proceed" key to proceed to the next procedure. Then, the navigation system calculates and determines a guided route to the destination, i.e., the selected POI. After determining the guided route, the navigation system starts the route guidance as shown in FIG. 1F. Typically, the navigation system shows the intersection which is highlighted to show the next turn and a direction of the turn. Such route guidance by the navigation system is also given by voice instructions.

As noted above, typically, a user inputs an address or a name of a particular point of interest by using a keyboard as shown in FIG. 1D for setting a destination. In the case where the user has made a mistake in inputting the address or name of the destination, the user had to return to the point where the mistake is made in order to correct the mistake.

FIGS. 2A–2C show the process for correcting a wrong entry in such a situation. FIGS. 2A and 2B show an example of display where a user has inputted a place name "Joey Mobil" in a text window 27 through a keyboard 28. Suppose the correct place name is "Jody Mobil" and the user wants to correct the error. Thus, in this case, the user wants to change the letter "e" to "d".

In the conventional navigation system, the user has to delete the letters in the text window with use of a "delete" key to move the cursor backward to arrive at the letter "e" as shown in FIG. 2C. In other words, the letters that have been already inputted have to be deleted by this process even though most of them are correct. In this example, the letters "y Mobil" are erased even though all of them are correct. Namely, when the user has to correct the single letter, she has to re-type the rest of the letters.

There is also a situation where the user does not know the exact name of the destination. For example, the user wants to visit a particular gas station whose name is "Jody Mobil" in the above example, however, she knows only that the name ends with "Mobil". The user may know that the first word of the place name to visit starts with "Jo" and ends with the letter "y", but she is not certain whether it is "Joey", "Joay" or "Jody", etc. Thus, it is desirable for the user to know what a letter comes between them to specify the location to visit without repeatedly typing the correct letters.

Thus, what is needed is a navigation system having an improved key correction function for inputting text data which allows the user to move a cursor to a particular location where a mistake is made or correctness is not certain, and provides a feedback to the user by searching the possible letter from the database.

SUMMARY OF THE INVENTION

It is, therefore, an object of the present invention to provide a navigation system incorporating an input data correction method and apparatus with key filtering for assisting a user to easily correct the input data.

It is another object of the present invention to provide a navigation system incorporating an input data correction method and apparatus with key filtering to find possible entries by replacing or inserting a character at a point of data entry selected by user.

It is a further object of the present invention to provide a navigation system incorporating an input data correction method and apparatus with key filtering to correct a mistake at a point of data entry selected by user without need of erasing the remaining characters.

It is a further object of the present invention to provide a navigation system incorporating an input data correction method and apparatus with key filtering which finds possible entries and displays the keys to be selected in a manner easily discernible from the other keys.

The input data correction method and apparatus of the present invention is designed for use with a navigation system to allow the user to change only the incorrect letter without re-typing other letters. The input data correction method and apparatus of the present invention is also designed to provide a feedbacked information to the user obtained by filtering the key candidates to help the user to input a correct information into the navigation system.

In one aspect of the present invention, the input data correction method of the present invention is comprised of the steps of: displaying a keyboard screen, inputting data through alphanumeric keys on the keyboard screen, positioning a cursor to a location of a character of the input data that is desired to be changed, searching for candidate entries that match the input data if the character at the cursor location of the input data is changed, highlighting alphanumeric keys corresponding to the characters to change the character at the cursor location so that the input data after the change match with the candidate entries, and selecting one or more highlighted keys thereby changing the input data to the candidate entry.

After changing the input data by selecting one or more highlighted keys, the method further includes the steps of: highlighting alphanumeric keys corresponding to characters that follow the input data that has been changed so that the input data added with the characters that follow match with the candidate entries, and selecting one or more highlighted keys thereby changing the input data to the candidate entry.

After changing the input data, the method further includes the steps of: positioning the cursor on the input data that has been changed to specify a location of a character that is desired to be changed, searching for candidate entries that match the input data if the character at the cursor location of the input data is changed, highlighting alphanumeric keys corresponding to the characters to change the character at the cursor location so that the input data after the change match with the candidate entries, and selecting one or more highlighted keys thereby changing the input data to the candidate entry.

In the correction method, when a candidate entry that match the input data is not found even if the character at the cursor location of the input data is changed, the method further includes the steps of: displaying a warning message that a candidate entry is not found and prompting to select whether a best match search should be performed, and searching for a candidate entry that is most similar to input data when the best match search is selected.

The method further includes the steps of: highlighting alphanumeric keys corresponding to the characters to change the character at the cursor location so that the input data after the change match with the candidate entry that is most similar to the input data before the change, and selecting one or more highlighted keys thereby changing the input data to the candidate entry.

Another aspect of the present invention is the input data correction apparatus incorporated in the navigation system for implementing the various steps defined in the method noted above.

According to the present invention, the navigation system allows the user to correct the input data by means of key filtering. The user does not have to erase all the characters that have been input to go back to the point where a mistake was made. Moreover, the navigation system can provide a feedback to the user by examining possible entries and associated keys that should be used and reflecting the results on the input display. In correcting the mistake, the user is able to choose either to replace a particular character, insert a particular character, or delete a character at a cursor point. The navigation system checks the database to find a most similar entry when there is no place name address that exactly matches the entry with or without the correction at the cursor point.

Because the keys of the character that can be inserted or replaced with the old character are highlighted in an easily be discernible manner, the user can easily and quickly correct the mistakes. Moreover, even when the user is not certain about the name of a particular place name or address, the navigation system can search for candidate place names or addresses to provide visual aid by distinguishing correct keys from the rest of the keys. The user can refresh his memory because the navigation system can reduce possible keys through the key filtering and give useful feedback to the user. Even when the user does not know the exact name or address, the user is able to make an educated guess because the navigation system limits the keys to be used.

BRIEF DESCRIPTION OF THE DRAWINGS

FIGS. 1A–1F are schematic diagrams showing an example of process and screen display of a navigation system for specifying a destination, determining a route to the destination, and guiding the user to the destination.

FIG. 10 is a flow chart showing a basic operational process of the input data correction method of the present invention with the key filtering function.

DETAILED DESCRIPTION OF THE INVENTION

The present invention will be described in detail with reference to the accompanying drawings. The input data correction method and apparatus of the present invention is designed for use with a navigation system to allow the user to change only the incorrect letter without re-typing other letters. The input data correction method and apparatus of the present invention is also designed to provide feedbacked information to the user obtained by filtering the possible entries and selecting the key candidates to help the user to input a correct information into the navigation system.

The navigation system having the input data correction method actively searches for possible entries from a database storing place names and addresses, etc. The navigation system reflects the result of search on the keyboard display by eliminating characters that cannot come after certain letter combinations. The keys for the characters to be inserted or replaced will be highlighted to be easily distinguishable from the other characters. It should be noted that the word "highlight" used in this invention includes various ways to distinguish a particular key from other keys such as illuminating, changing brightness, blinking or flickering, or using different colors.

For example, when the user enters "Cactus B", the navigation system will search its database to determine possible entries (ex. place names) that matches the input data. If the navigation system finds two entries named "Cactus Burger" and "Cactus Books" in the database, the next possible letter is either "u" in "Burger" or "o" in "Books". Thus, the navigation system will highlight the two letters to help the user in selecting the next letter. In the case where the user knows the first and last part of the name to visit, the navigation system searches the database and finds possibilities of letters that can come between them and emphasizes the candidate letters on the keyboard screen to prompt the user to select one of them.

Figure 3:
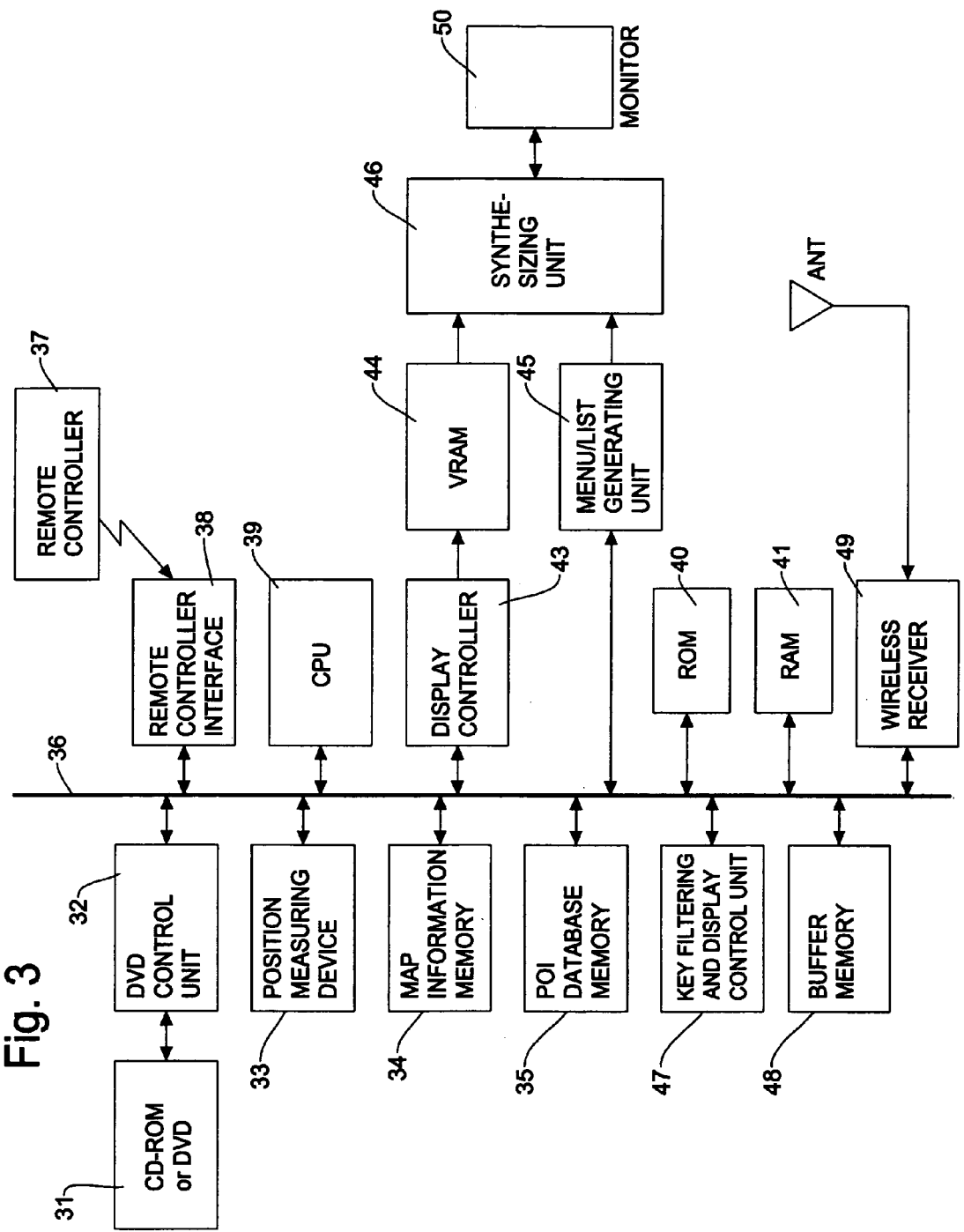
FIG. 3 is a block diagram showing an example of structure of a vehicle navigation system for implementing the present invention for correcting the input data with use of a key filtering function.

The data correction method and apparatus of the present invention is advantageously applicable to a vehicle navigation system. FIG. 3 shows an example of structure of a vehicle navigation system implementing the present invention. It should be noted that the present invention can also be applied to a portable navigation device such as a one implemented by a PDA (personal digital assistant) device, a lap-top computer, or other hand-held devices.

In the block diagram of FIG. 3, the navigation system includes a map storage medium 31 such as a CD-ROM, DVD, hard disc or other storage means (hereafter "DVD") for storing map information, a DVD control unit 32 for a controlling an operation for reading the map information from the DVD, a position measuring device 33 for measuring the present vehicle position. The position measuring device 33 has a vehicle speed sensor for detecting a moving distance, a gyroscope for detecting a moving direction, a microprocessor for calculating a position, a GPS receiver, and etc.

The block diagram of FIG. 3 further includes a map information (data) memory 34 for storing the map data which is read out from the DVD 31, a POI database memory 35 for storing database information such as point of interest (POI) information which is read out from the DVD 31, a remote controller 37 for executing a menu selection operation, an enlarge/reduce operation, a destination input operation, etc. and a remote controller interface 38.

The navigation system further includes a bus 36 for interfacing the above units in the system, a processor (CPU) 39 for controlling an overall operation of the navigation system, a ROM 40 for storing various control programs such as a route search program and a map matching program necessary for navigation control, a RAM 41 for storing a processing result such as a guide route, a display controller 43 for generating a map image (a map guide image and an arrow guide image) on the basis of the map information, a VRAM (Video RAM) 44 for storing images generated by the display controller, a menu/list generating unit 45 for generating menu image/various list images, a synthesizing unit 46, a key filtering and display control unit 47, a buffer memory 48, a wireless receiver 49, and a monitor (display) 50.

The key filtering and display control unit 47 plays an essential role in the present invention for conducting a data search and correction process for finding candidate characters and prompting the user to select an appropriate character on the keyboard screen. The key filtering and display control unit 47 receives map data from the map data storage 31 and an entry (input data) by the user through the input means. The navigation system of the present invention uses such map data as a database for assisting the user to correct the input data.

When receiving the data entry by the user and a particular location (character) on the entry, the key filtering and display control unit 47 searches for place names and addresses in the database. The key filtering and display control unit 47 retrieves candidate entries that can match with the input data if the character of the particular location is either deleted, inserted by another character or replaced with another character. During the operation of the input data correction, the associated data can be temporally stored in the buffer memory 48.

Based on the search result, the key filtering and display control unit 47 controls the monitor 50 to display the keyboard screen in a manner that the user can easily distinguish the keys for correcting the input data from other keys. Thus, the user can selects one or more highlighted keys for conducting either inserting a highlighted character, replacing the character at the cursor point with the highlighted character, or deleting the character at the cursor point. In the case where there is no candidate entry exists, the key filtering and display control unit 47 causes the monitor 50 so that the user can select whether the best match (highest similarity) search should be conducted.

Figure 4:
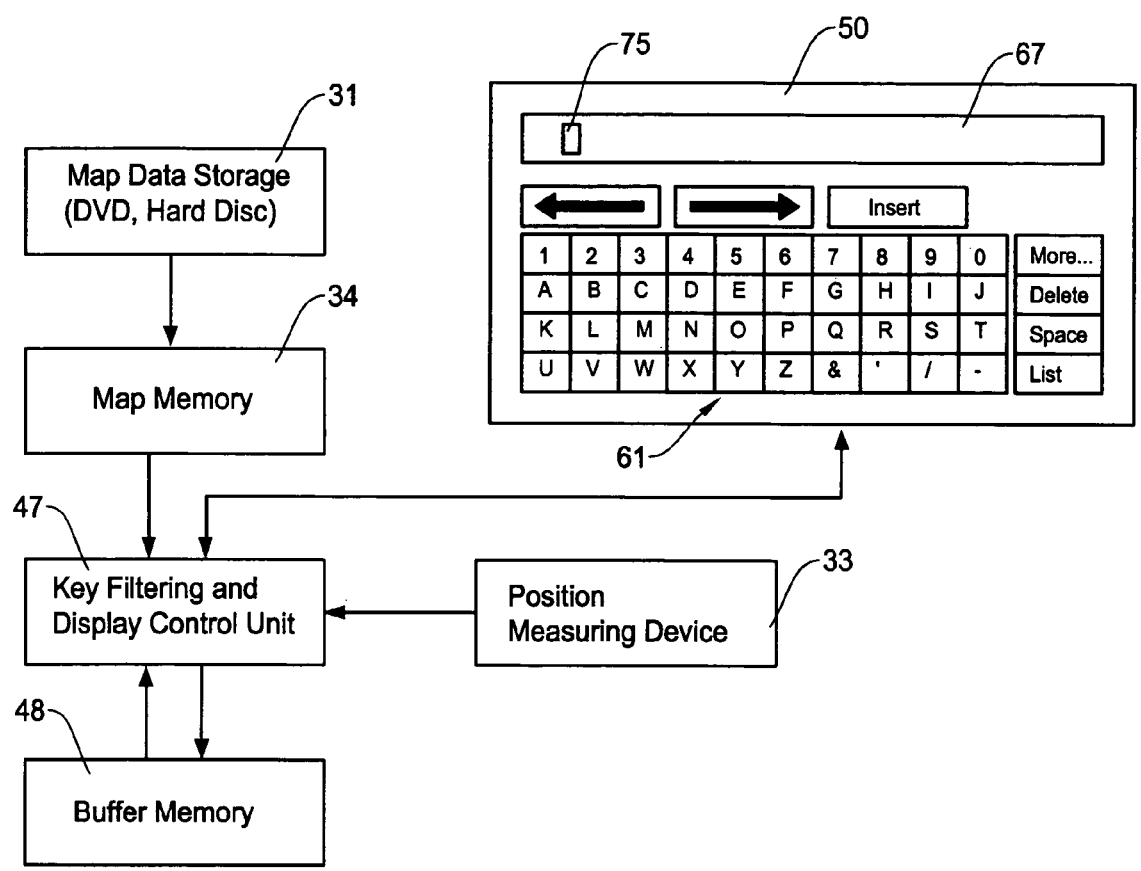
FIG. 4 is a functional block diagram showing a basic structure of the apparatus of the present invention extracted from the block diagram of FIG. 3 for correcting the input data with use of the key filtering function.

FIG. 4 is a functional block diagram showing an example of basic structure of the apparatus of the present invention for conducting the input data correction procedure. The structure of FIG. 4 is illustrated by the components in the block diagram of FIG. 3 that are directly related to the operation of the present invention. The components of the apparatus of the present invention includes a monitor 50 for interfacing with the user and displaying the keyboard screen reflecting the search results, and a key filtering and display control unit 47 for controlling an overall operation of the method and apparatus of the present invention.

The block diagram of FIG. 4 further includes a map data storage 31 such as a DVD or a hard disc for storing map data, a map memory 34 for storing map data from the map data storage 31, a position measuring device 33 for detecting a current position of the user, and a buffer memory 48 for temporarily storing various types of data for operation and data processing of the apparatus. In an actual application, the key filtering and display control unit 47 can be implemented by the CPU 39 in FIG. 3 or by a separate controller such as a microprocessor. Further, the buffer memory 48 can be implemented by RAM 41 in FIG. 3 or other memory.

The map data stored in the map data storage 31 and the map memory 34 typically includes POI (point of interest) data which have place names and addresses of various places. The navigation system of the present invention uses such map data as a database to retrieve candidate entries (ex. place names) for assisting the user to correct the input data. The key filtering and display control unit 47 also receives information indicating the current position of the user from the position measuring device 33.

In operation, the user inputs a place name or address for specifying a destination through a keyboard screen on the monitor 50. In the case of entering the place name, the user selects the alphanumeric keys 61 to type-in the place name on a text window 67 on the keyboard screen. The user realizes that she has made a mistake in typing the input data and moves a cursor 75 back to a location of the character that she wants to change. Based on the particular location of the cursor 75, the key filtering and display control unit 47 checks the data base (ex. map data) to search for place names (entries) that match the input data if the character at the cursor point is changed (either deleted, inserted, or replaced). The key filtering and display control unit 47 examines the map data from the map memory 34 and map data storage 31.

The key filtering and display control unit 47 retrieves the candidate entries that match the input data if the character at the cursor point is either deleted, inserted-by other character, or replaced with other character. Preferably, such candidate entries are temporally stored in the buffer memory 48 so that the key filtering and display control unit 47 can access the stored data quickly for remaining operations. The key filtering and display control unit 47 causes the monitor 50 to highlight the alphanumeric keys 61 corresponding to the characters to change the cursor point character so that the input data after the change match with the candidate entries. The key filtering and display control unit 47 also causes the monitor 50 to highlight the function keys such as an insert/replace key or a delete key to change the cursor point character.

Because only the keys that create the match and an appropriate function key are highlighted, the user can easily find the character and function (insert, delete, replace) keys to be used for correcting the input data. If the corrected input data shows an intended destination, the user confirms the destination so that the navigation system calculates the route to the destination. Then, the navigation system starts the route guidance operation to the destination. If the corrected data is not the right one and the user further wants to change a part of the input data, she moves the cursor on the input data and repeats the foregoing operation.

In the case where no much is found from the database when changing the character at the cursor point as noted above, the key filtering and display control unit 47 causes the monitor 50 to display a warning message. The warning message informs the user that there is no match found when changing the cursor point character. The warning message prompts the user to select whether a best match search should be conducted. Here, the best match search indicates that the navigation system searches an entry that is most similar to the input data but not exactly the same. Thus, if the user wants the best match search, the navigation system retrieves the candidate entry that matches best to the input data. Through the procedure noted above, the user can easily correct the input data and set the destination in the navigation system.

Figure 5:
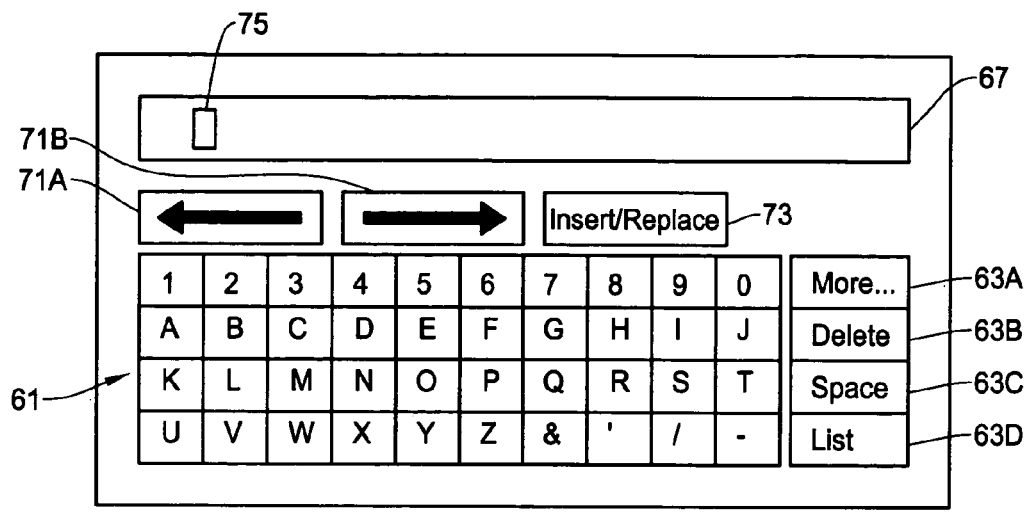
FIG. 5 is a schematic diagram showing an example of screen display implementing the input data correction method and apparatus of the present invention.

FIG. 5 shows an example of a keyboard screen of the present invention for implementing the input data correction method. In addition to components that are common to the conventional navigation display, the keyboard screen of the present invention includes a cursor 75 in a text window 67, a left arrow key 71A, a right arrow key 71B, and an insert/replace key 73 which toggles between the insert function and the replace function. Alphanumeric keys 61 are basically the same as those used in the conventional technology. The user inputs information such as an address or a place name for specifying the destination through the alphanumeric keys 61.

The keyboard screen of FIG. 5 further includes function keys 63A–63D. A "More" key 63A is provided to display additional candidate of input keys. A "Delete" key 63B is provided to delete one character at each operation. A "Space" key 63C is provided to input one space at each operation. A "List" key 63D is provided to list all of the entries that match the input data. Some other function keys may be added to improve usability of the navigation system. During the input data correction process, the insert/replace key 73 is used for inserting a character in the location of the cursor 75 or replacing the character at the cursor point with other character, and the delete key 63B is used to remove the character at the cursor point.

Figure 2A:
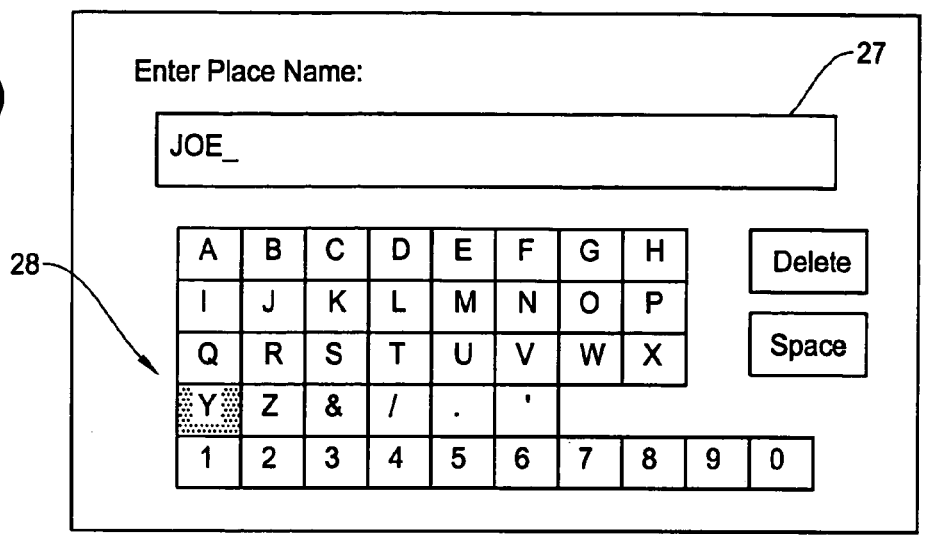
FIGS. 2A–2C are schematic diagrams showing an example of keyboard screen for entering destination data in the conventional navigation system and problems associated with the data entry process.
Figure 2B:
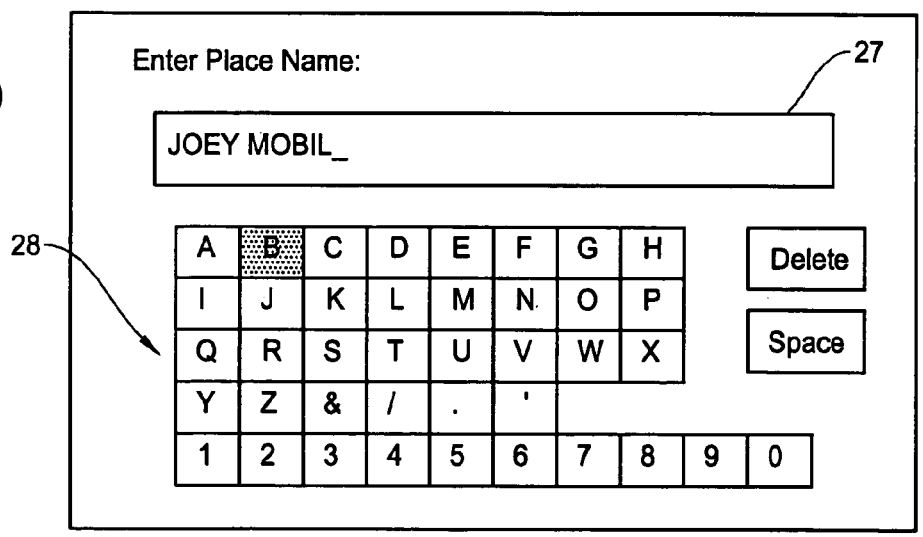
Figure 2C:
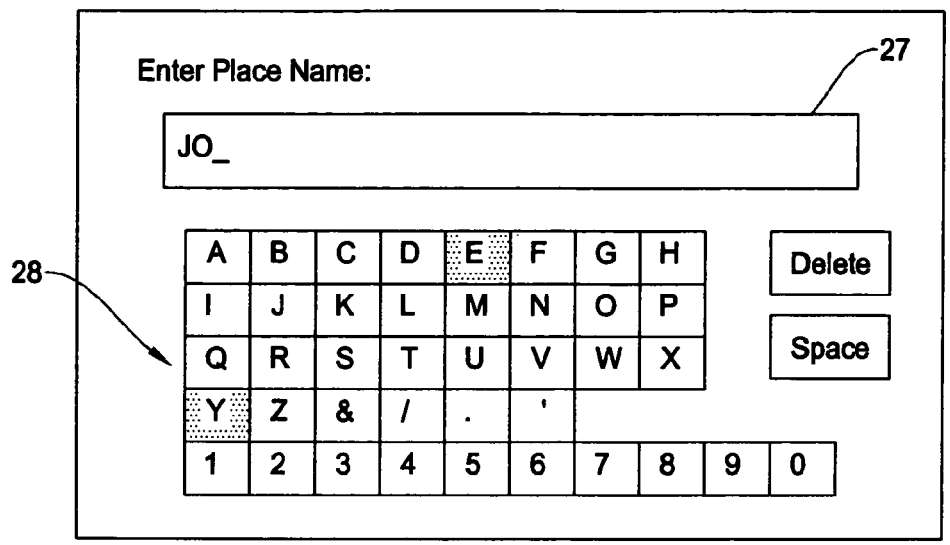
Figure 6:
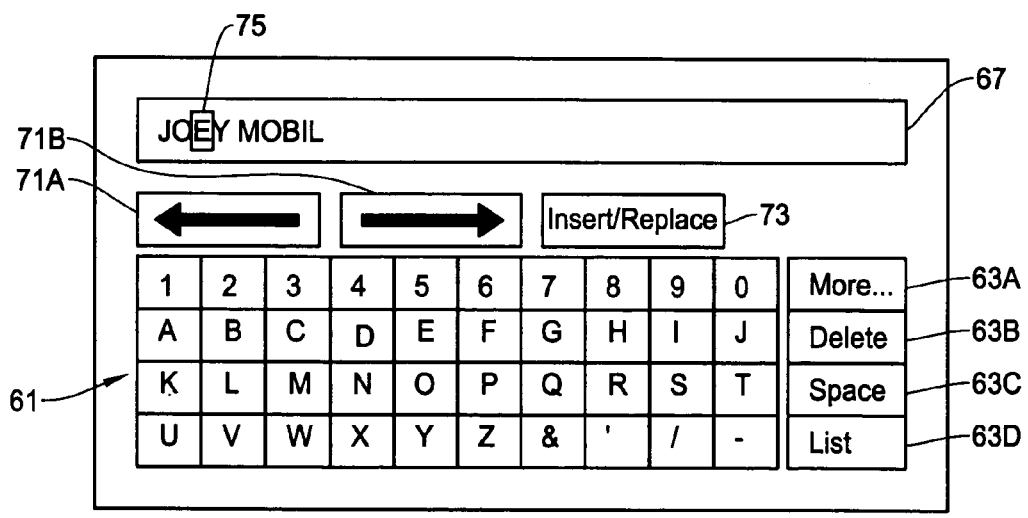
FIG. 6 is a schematic diagram showing an example of screen display implementing the input data correction method of the present invention where a particular point of the input data is specified by a cursor.

FIG. 6 shows a display example where the user has input a place name "JOEY MOBIL" in the text window 67. The cursor 75 is shown in the text window 67. The user finds that the letter "E" on "JOEY" is not correct and wants to change only this letter "E" to the letter "D" which is the same situation as described with reference to FIGS. 2A–2C. The user can move the cursor 75 right and left by pressing the arrow keys 41B and 41A respectively. Unlike the conventional navigation system, the navigation system of the present invention will not erase the characters even if the cursor 75 is moved backwardly. Thus, when the cursor 75 is moved from the rightmost position of the input data to the position of the character "E" of the word "JOEY", the navigation system does not erase "Y Mobil" which would have been erased in the conventional navigation system.

When the cursor 75 is moved on a particular letter, the navigation system will perform a key filtering to determine possible key candidates. In the example of FIG. 6, the user moves the cursor 75 to be on the letter "E" of the word "JOEY". The navigation system will check the database, for example, place names and addresses typically stored in the map data storage 31 (FIGS. 3 and 4), etc., to determine what character or characters can replace the letter "E" in this example.

In FIGS. 7A–7E, it is assumed that the following entries (place names) exist in the database: "Joy Mobil Gas Station", "Joy Mobil Repair Station", "Jody Mobil Gas", and "Joey Mobil Gas Station". In this situation, the possible letter that can be replaced with the letter "E" is a letter "D" for the place name "Jody Mobil Gas". It is also possible to delete the letter "E" to modify the word "JOEY" into "JOY" since entries such as "Joy Mobil Gas Station" and "Joy Mobil Repair Station" exist. To assist the user to select the appropriate keys, the navigation system will reflect the search result on the keyboard screen. Typically, a candidate letter and a function key on the keyboard are highlighted so that the user can easily identify the candidate letters and functions to select one of them.

Figure 7A:
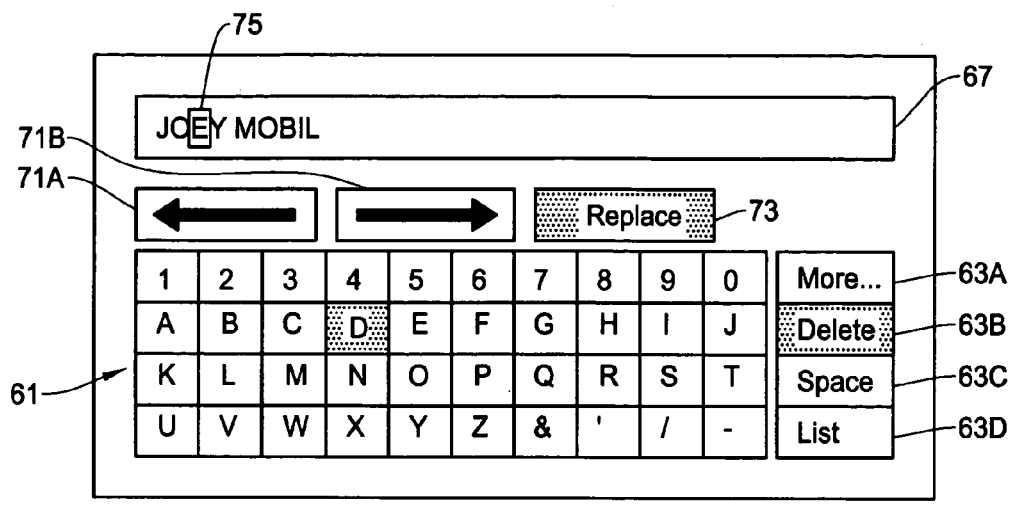
FIGS. 7A–7E are schematic diagrams showing further examples of screen display implementing the input data correction method where a character specified by the user is changed or deleted with the aid of the key filtering function of the present invention.

In this example, the dot hatch in the drawings indicates that the key is highlighted, i.e., other keys cannot replace the letter "E" according to the result of search in the database. In FIG. 7A, only the key for the letter "D", the "Delete" key 63B, and the replace key 73 are highlighted to provide visual offer to assist the user. The user can easily select the correct key to replace the incorrect letter "E" with the letter "D" by pressing replace key 73. The same result can be obtained by pressing the delete key 63B to delete the letter "E" and pressing the letter "D" or pressing the insert key 73 to insert the letter "D". The user does not have to type the characters "A MOBIL".

Figure 7B:
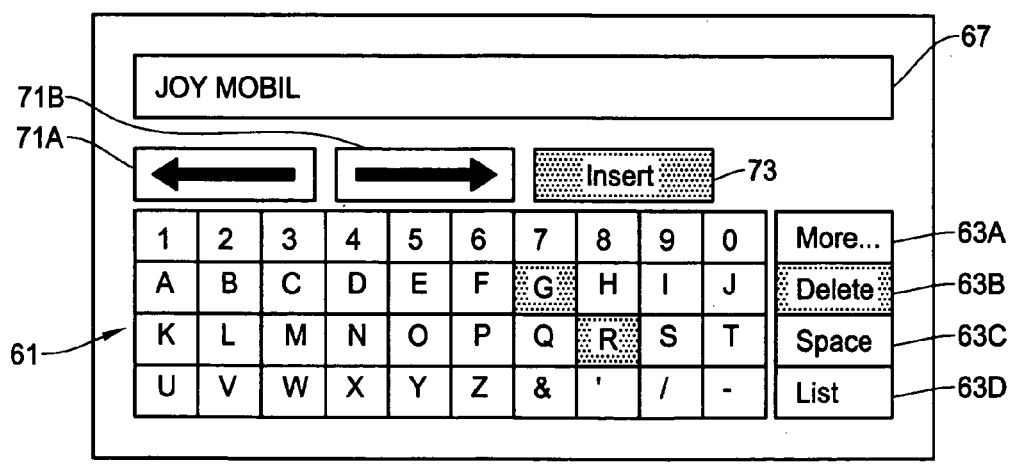

FIG. 7B shows the display where the user has pressed the "Delete" key 63B in the screen of FIG. 7A, thereby deleting the letter "E". The letters in the text window 67 reflect the change and they now read "JOY MOBIL". The navigation system checks possible entries for "Joy Mobil" in the database. As noted above, "Joy Mobil Gas Station" and "Joy Mobil Repair Station" can match the input, i.e., only the letters "G" or "R" can come after the "JOY MOBIL". Thus, the navigation system will reflect the result on the display by highlighting the keys for letters "G" and "R" as shown in FIG. 7B to prompt the user to select one of them.

In FIG. 7B, if the user selects the letter "G", the only place name that matches the choice is "Joy Mobil Gas Station", thus, the navigation system will automatically display the full name without requiring the user to enter the rest of the letters. If the user selects the letter "R", the only place name that matches the choice is "Joy Mobil Repair Station", thus, the navigation system will automatically display the full name without requiring the user to enter the rest of the letters.

Figure 7C:
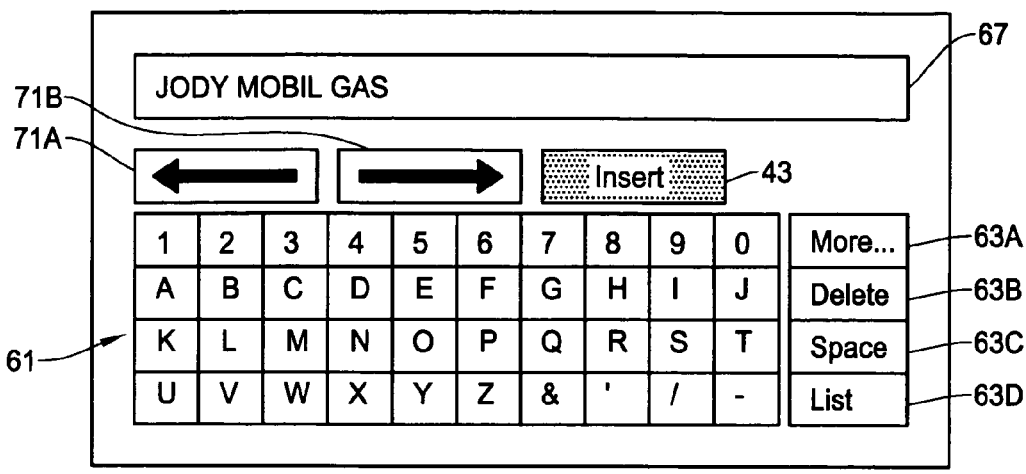

Similarly, FIG. 7C shows the display where the user has pressed the replace key 73 when the letter "D" is highlighted from the screen of FIG. 7A. The same result will be obtained by pressing the "Delete" key 63B to delete the character "E" on the cursor 75 and pressing the "Insert" key 73 to insert the highlighted letter "D" in the cursor position on the screen of FIG. 7A. Because the only entry found in the database is "Jody Mobil Gas", the navigation system can automatically fill the rest of the name, in this case "GAS", to free the user from the trouble of entering the remaining letters. As in the foregoing, because the navigation system of the present invention can narrow down the entries by filtering the possible entries, the user can quickly set the desired entry.

Figure 7D:
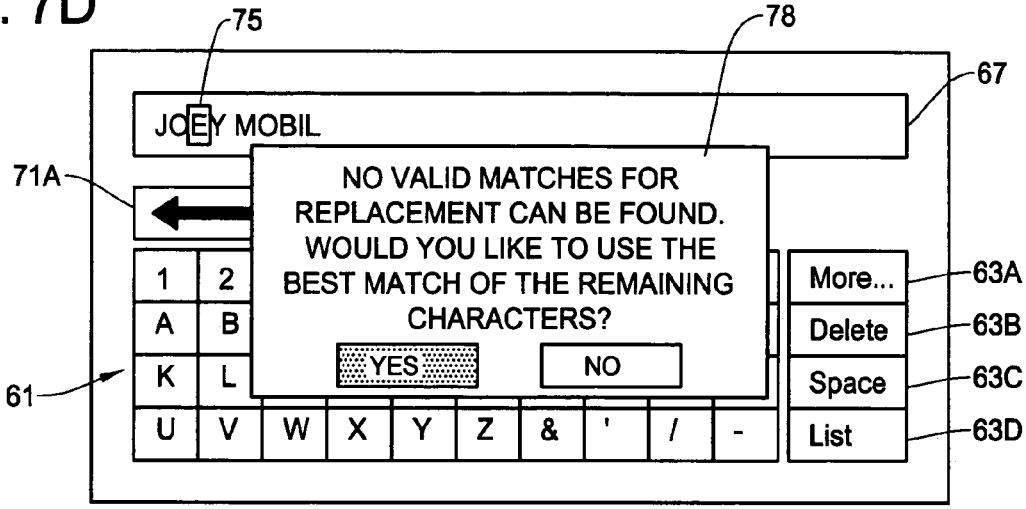

In the case where there is no entry (place name) that can replace the letter at the cursor point, the navigation system displays a warning message and prompts the user to decide whether the navigation system should find the best match of the input data. An example of such a warning message on the display is shown in FIG. 7D. Thus, if the user has selected to change the letter "E" on the word "JOEY-" but there is no match for that change, the navigation system displays the pop-up screen 78 with the warning message to prompt the use to select "Yes" to find a best match or "No" to return to the original screen.

Figure 7E:
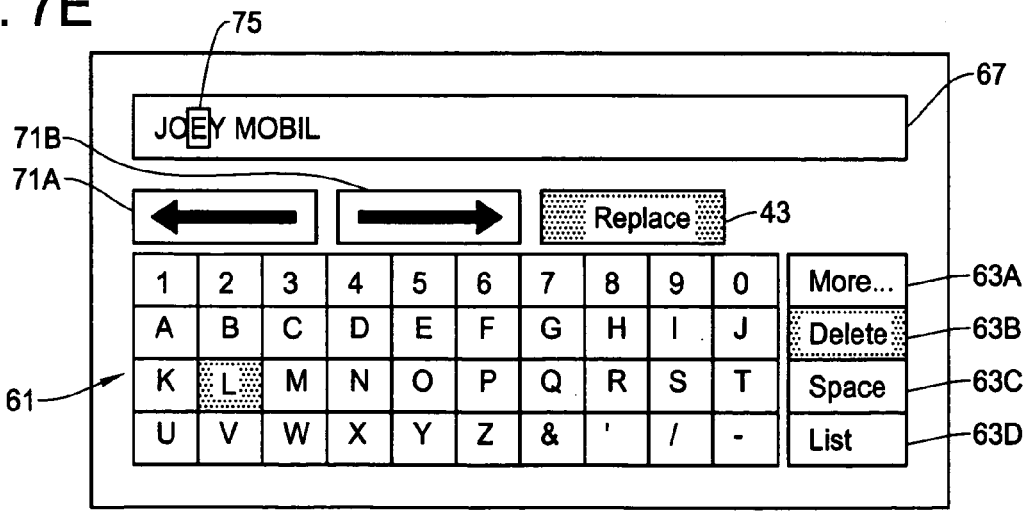

If the user selects "Yes", the navigation system will find entries that best match with "JOEY MOBIL" in the text window 67 and reflect the result on the display by highlighting the matching keys. It is assumed that there are three place names "Joey Mobile", "Joly Mobil" and "Joy Mobil" that are thought to be similar to the input data "JOEY MOBIL". If the navigation system judges that "Joly Mobil" is most similar (best match) to the input data "JOEY MOBIL", the navigation system highlights the letter "L" as shown in FIG. 7E to invite the user to replace the letter "E" with the letter "L".

Thus, the navigation system of the present invention provides a highly efficient method of correcting the input data. It searches for possible entries from the database of place names, address, etc. that match the input data entered by the user. Based on the possible entries, the navigation system will identifies the candidate characters to be replaced with a particular character at the cursor position specified by the user. When the exact match is not found, the navigation system displays the warning message indicting that there no valid match and prompts the user to decide whether the user wants to search possible entry of best match with the input data.

FIGS. 8A–8D and 9A–9B show further examples in the input data correction method of the present invention which include a process of inserting a character between particular letters. Suppose the user finds that a certain character is missing in the input data, she moves the cursor 75 on the input data by the left and right keys 71A and 71B to the spot where she wants to insert a character. As noted above, the insert/replace key 73 works either the insert key or the replace key by toggling between the two. Thus, the user can set the key 73 to the insert mode. When there exists an entry (place name) that matches the input data if a character is inserted in the cursor point, the navigation system automatically highlight the insert key 73.

Figure 8A:
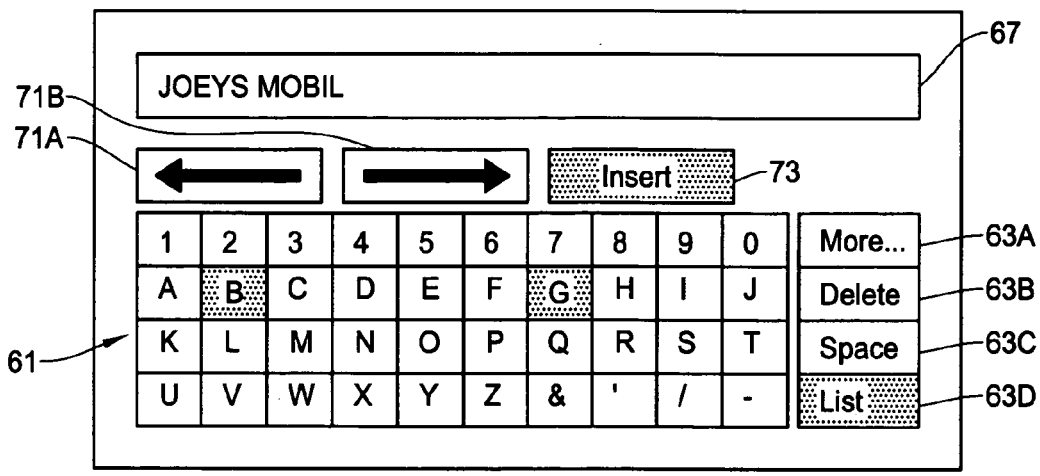
FIGS. 8A–8B are schematic diagrams showing a further example of screen display implementing the input data correction method where a character detected by the key filtering function is inserted in the input data at a location specified by the user.
Figure 8B:
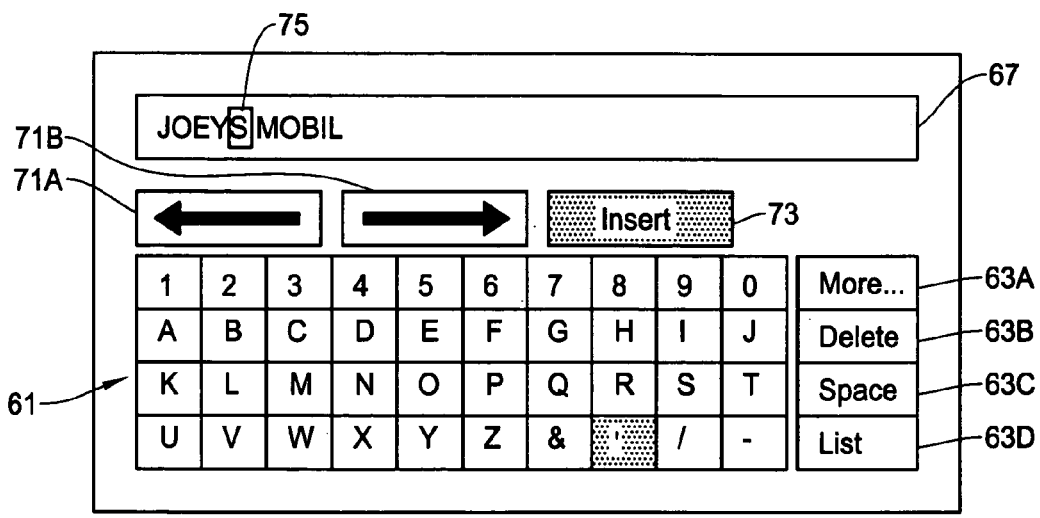

In the example of FIG. 8A, the user enters "JOEYS MOBIL", and at this point realizes that this input data is not a valid one. The user tries to insert a character to find a correct place name. Thus, in FIG. 9B, the user moves the cursor 75 on the input data. Every time the cursor 75 is moved, the navigation system searches for a place name that matches with the input data that is inserted with a certain character. For example, if a place name "Joey's Mobil" exists, when the cursor is positioned on the letter "S" on the word "JOEYS", the navigation system highlights the character " ' " (apostrophe) as shown in FIG. 8B. Thus, when the user presses the "Insert" key 73, the apostrophe is inserted before the letter "S" to change the input data to read "JOEY'S MOBIL".

In this example, the insertion of a character is made to the left side of the cursor 75. Thus, the user can insert a character between the letters "Y" and "S" in FIG. 8B because the cursor is on the letter "S". It is also feasible to present the navigation system such that the insertion of a character is made to the right side of the cursor 75. Still other possibility is to provide a special cursor representing a space to indicate the spot where an insertion is to be made.

Figure 9A:
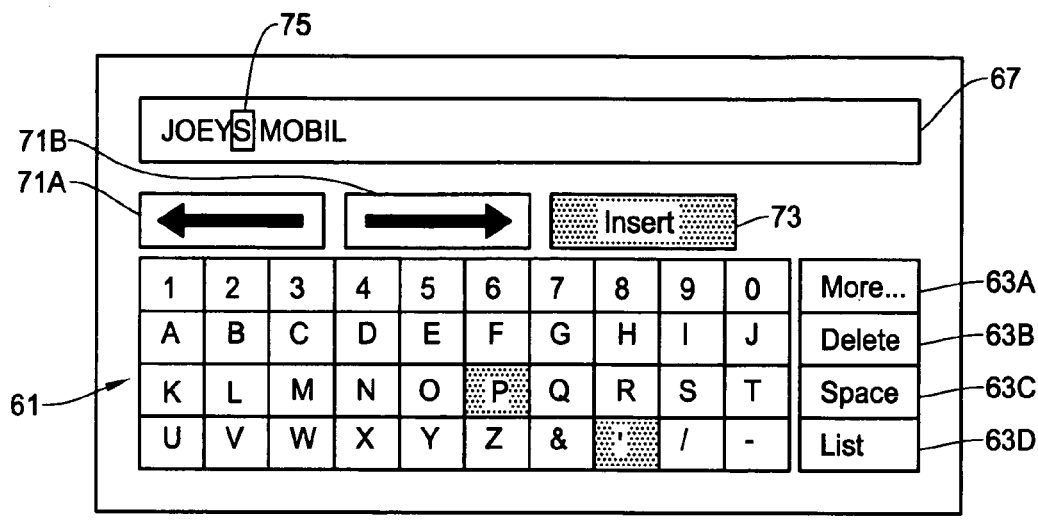
FIGS. 9A–9D are schematic diagrams showing a further example of screen display implementing the input data correction method where a character detected by the key filtering function is inserted in the input data at a location specified by the user.

FIGS. 9A–9D show further examples of input data correction method of the present invention using the key filtering function. FIG. 9A shows the condition where the navigation system has found the possible entries for the same situation as that shown in FIG. 8B. Here, it is assumed that the following entries (place names) are found: "Joey's Mobil Services", "Joeypjo Mobil Services" "Joeypjo's Mobil Services", and "Joeypjojo's Mobil Services". Thus, the apostrophe " ' " and the letter "P" are the possibilities that can be inserted between the letters "Y" and "S". As a result, in the display shown in FIG. 9A, keys for the letters "P" and " ' " are highlighted.

Figure 9B:
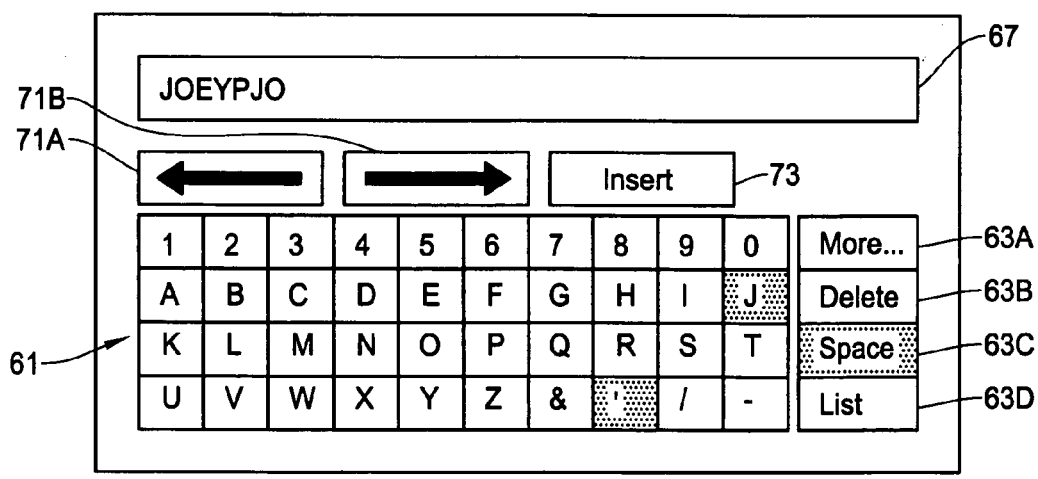

FIG. 9B is a display example where the user has selected the letter "P" in FIG. 9A. As a result, the place name "Joey's Mobil Services" becomes no longer a candidate entry, and the place names "Joeypjo Mobil Services" "Joeypjo's Mobil Services", and "Joeypjojo's Mobil Services" remain as possible entries. Since these three entries have the common beginning letters "JOEYPJO", it is automatically displayed in the text window 67 in FIG. 9B. The possible next character following the letters "JOEYPJO" is "J" "'" or a space. Thus, the display in FIG. 9B reflects this result in which the keys for "J", "'" and the space key 63C are highlighted while other alphanumeric keys are unchanged.

Figure 9C:
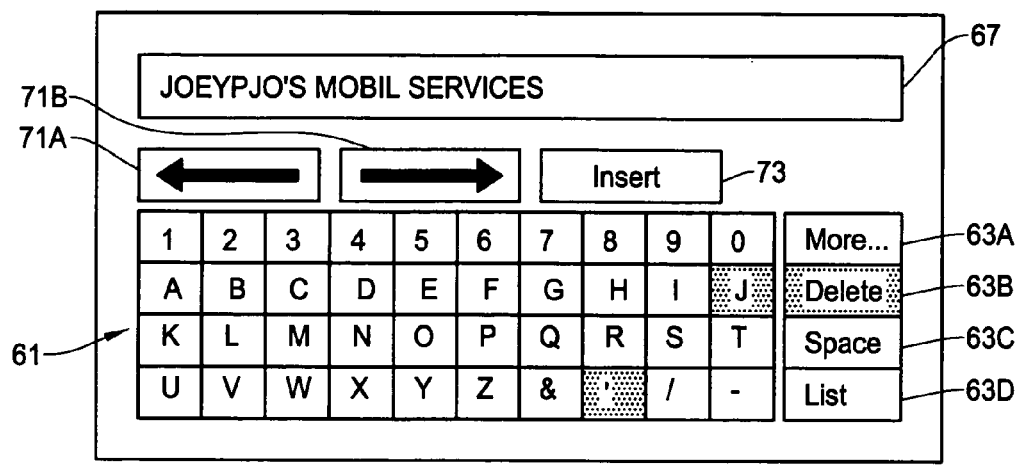

FIG. 9C is a display example where the user has selected the apostrophe "'" in FIG. 9B to be inserted. As a result, only the place name "Joeypjo's Mobil Services" is a possible entry. Thus, the navigation system display the full name of this entry without requiring the user to input the remaining characters. If this entry is the correct destination for the user, she confirms the destination, and the navigation system moves to the route guidance mode.

Figure 9D:
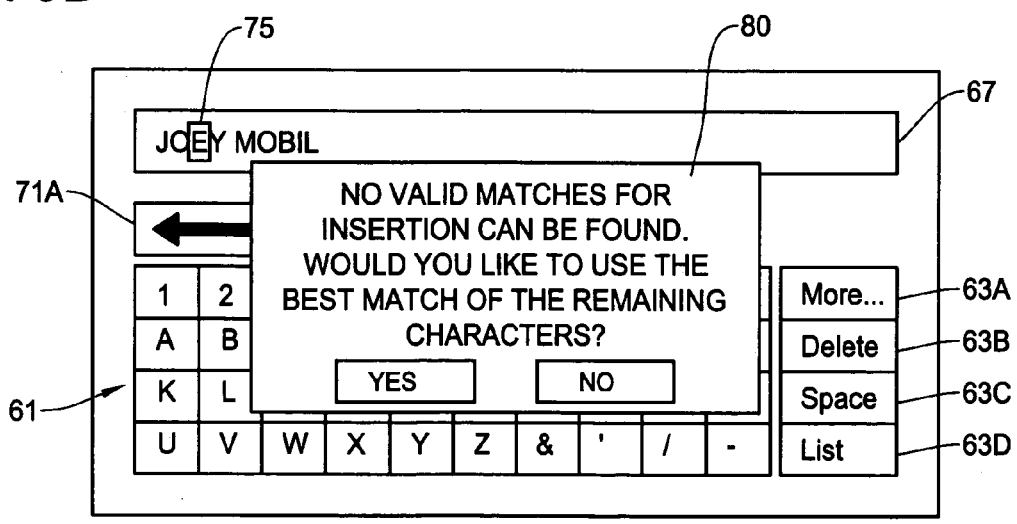

In the case where there is no valid entry for the insertion point, the navigation system shows a warning message and prompts the user to determine whether the navigation system should find the best match (highest similarity) of the input data on the text window 67. An example of such a display is shown in FIG. 9D. Thus, if the user has selected to insert a letter at a particular location of the input data but there is no match for that data, the navigation system will find an entry that is most similar to the input data in the text window.

FIG. 10 is a flow chart showing a basic operational process of the present invention for correcting the input data with use of the key filtering function. At step 101, the navigation system displays the keyboard screen on which the user inputs a place name or address for specifying a destination. The user selects the alphanumeric keys to type-in the place name or address in the text window on the keyboard screen. At step 102, the user realizes that she has made a mistake in typing the input data and moves a cursor back to a location of the character that she wants to change.

In step 103, based on the particular location of the cursor on the input data, the navigation system checks the data base (ex. map data) to search for place names (entries) that match the input data if the character at the cursor point is changed, i.e., either deleted, inserted, or replaced. At step 104, it is determined whether a candidate entry is found, and if the answer is "yes", the process moves to step 105. At step 105, the navigation system highlights the alphanumeric keys corresponding to the characters to change the cursor point character so that the input data after the change match with the candidate entries. The navigation system also highlights the function keys such as an insert/replace key or a delete key to change the cursor point character with the highlighted character.

Therefore, the user selects one or more highlighted keys and if the resultant input data is a destination that the user wanted, she confirms the destination at step 106. Thus, the navigation system calculates a route to the destination and moves to the route guidance mode. If the resultant input data is not the correct destination for the user, and the user further wants to change the part of the input data, the process goes back to the step 102 to repeat the above procedure for the different cursor point.

In the step 104, in the case where no much is found from the database when changing the character at the cursor point, the navigation system displays a warning message in step 107. The warning message informs the user that there is no match found when changing the cursor point character. The warning message prompts the user to select whether a best match search should be conducted. Thus, in step 108, it is determined whether the best match search is requested by the user. If the user does not want the best match search, and the user further wants to change other part of the input data, the process goes back to the step 102. If the user does not want the best match search or input data correction, the process ends.

If the user wants the best match search at step 108, the navigation system searches an entry that is most similar to the input data but not exactly the same in step 109. The navigation system retrieves the candidate entry that matches best to the input data. Thus, at step 105, the navigation system highlights the alphanumeric keys corresponding to the characters to change the cursor point character and the function keys to be used so that the input data after the change is most similar to the candidate entry.

As has been described above, the navigation system of the present invention allows the user to correct the input data by means of key filtering. The user does not have to erase all the characters that have been input to go back to the point where a mistake was made. Moreover, the navigation system can provide a feedback to the user by examining possible entries and associated keys that should be used and reflecting the results on the input display. In correcting the mistake, the user is able to choose either to replace a particular character, insert a particular character, or delete a character at a cursor point. The navigation system checks the database to find a most similar entry when there is no place name address that exactly matches the entry with or without the correction at the cursor point.

Because the keys of the character that can be inserted or replaced with the old character are highlighted in an easily be discernible manner, the user can easily and quickly correct the mistakes. Moreover, even when the user is not certain about the name of a particular place name or address, the navigation system can search for candidate place names or addresses to provide visual aid by distinguishing correct keys from the rest of the keys. The user can refresh his memory because the navigation system can reduce possible keys through the key filtering and give useful feedback to the user. Even when the user does not know the exact name or address, the user is able to make an educated guess because the navigation system limits the keys to be used.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. An input data correction method for assisting a user to enter data in a navigation system, comprising the steps of:
    displaying a keyboard screen;
    inputting data through alphanumeric keys on the keyboard screen;
    positioning a cursor to a location of a character of the input data that is desired to be changed;
    searching for candidate entries that match the input data if the character at the cursor location of the input data is changed;
    highlighting alphanumeric keys corresponding to the characters to change the character at the cursor location so that the input data after the change match with the candidate entries; and
    selecting one or more highlighted keys thereby changing the input data to the candidate entry.

2. An input data correction method as defined in claim 1, after said step of changing the input data by selecting one or more highlighted keys, further comprising the following steps of:
    highlighting alphanumeric keys corresponding to characters that follow the input data that has been changed so that the input data added with the characters that follow match with the candidate entries; and selecting one or more highlighted keys thereby changing the input data to the candidate entry.

3. An input data correction method as defined in claim 1, after said step of changing the input data by selecting one or more highlighted keys, further comprising the following steps of:

positioning the cursor on the input data that has been changed to specify a location of a character that is desired to be changed;

searching for candidate entries that match the input data if the character at the cursor location of the input data is changed;

highlighting alphanumeric keys corresponding to the characters to change the character at the cursor location so that the input data after the change match with the candidate entries; and selecting one or more highlighted keys thereby changing the input data to the candidate entry.

4. An input data correction method as defined in claim 1, when a candidate entry that matches the input data is not found even if the character at the cursor location of the input data is changed, the method further comprising the following steps of:

displaying a warning message that a candidate entry is not found and prompting to select whether a best match search should be performed; and searching for a candidate entry that is most similar to input data when the best match search is selected.

5. An input data correction method as defined in claim 4, further comprising the following steps of:

highlighting alphanumeric keys corresponding to the characters to change the character at the cursor location so that the input data after the change match with the candidate entry that is most similar to the input data before the change; and selecting one or more highlighted keys thereby changing the input data to the candidate entry.

6. An input data correction method as defined in claim 1, wherein said step of changing the input data by selecting one or more highlighted keys includes a step of either deleting the character at the cursor location, inserting a character in the cursor location, or replacing the character at the cursor location with another character.

7. An input data correction method as defined in claim 1, wherein said step of highlighting the alphanumeric keys includes a step of highlighting function keys that perform, when selected, either deleting the character at the cursor location, inserting a character in the cursor location, or replacing the character at the cursor location with another character.

8. An input data correction method as defined in claim 1, wherein said step of positioning the cursor to the location of the character includes a step of maintaining the characters of the input data when the cursor moves backwardly on the input data.

9. A navigation system for assisting a user to enter data in a navigation system, comprising:

means for displaying a keyboard screen;

means for inputting data through alphanumeric keys on the keyboard screen;

means for positioning a cursor to a location of a character of the input data that is desired to be changed;

means for searching for candidate entries that match the input data if the character at the cursor location of the input data is changed;

means for highlighting alphanumeric keys corresponding to the characters to change the character at the cursor location so that the input data after the change match with the candidate entries; and means for selecting one or more highlighted keys thereby changing the input data to the candidate entry.

10. A navigation system as defined in claim 9, further comprising:

means for highlighting alphanumeric keys corresponding to characters that follow the input data that has been changed by said changing means so that the input data added with the characters that follow match with the candidate entries; and means for selecting one or more highlighted keys thereby changing the input data to the candidate entry.

11. A navigation system as defined in claim 9, further comprising:

means for positioning the cursor on the input data that has been changed by said changing means to specify a location of a character that is desired to be changed;

means for searching for candidate entries that match the input data if the character at the cursor location of the input data is changed;

means for highlighting alphanumeric keys corresponding to the characters to change the character at the cursor location so that the input data after the change match with the candidate entries; and means for selecting one or more highlighted keys thereby changing the input data to the candidate entry.

12. A navigation system as defined in claim 9, comprising:

means for determining that a candidate entry that match the input data is not found even if the character at the cursor location of the input data is changed;

means for displaying a warning message that a candidate entry is not found and prompting to select whether a best match search should be performed; and means for searching for a candidate entry that is most similar to input data when the best match search is selected.

13. A navigation system as defined in claim 12, further comprising:

means for highlighting alphanumeric keys corresponding to the characters to change the character at the cursor location so that the input data after the change match with the candidate entry that is most similar to the input data before the change; and means for selecting one or more highlighted keys thereby changing the input data to the candidate entry.

14. A navigation system as defined in claim 9, wherein said means for changing the input data by selecting one or more highlighted keys includes means for either deleting the character at the cursor location, inserting a character in the cursor location, or replacing the character at the cursor location with another character.

15. A navigation system as defined in claim 9, wherein said means for highlighting the alphanumeric keys includes means for highlighting function keys that perform, when selected, either deleting the character at the cursor location, inserting a character in the cursor location, or replacing the character at the cursor location with another character.

16. A navigation system as defined in claim 9, wherein said means for positioning the cursor to the location of the character includes means for maintaining the characters of the input data when the cursor moves backwardly on the input data.

* * * * *